(12) United States Patent
Chen et al.

(10) Patent No.: US 10,850,918 B2
(45) Date of Patent: Dec. 1, 2020

(54) CONTAINER

(71) Applicants: NANTONG CIMC-SPECIAL TRANSPORTATION EQUIPMENT MANUFACTURE CO., LTD., Nantong, Jiangsu Province (CN); CIMC CONTAINERS HOLDING COMPANY LTD., Song Shan Lake Dongguan (CN); CHINA INTERNATIONAL MARINE CONTAINERS (GROUP) LTD., Shenzhen, Guangdong Province (CN)

(72) Inventors: Jinghua Chen, Song Shan Lake Dongguan (CN); Zhijun Huang, Nantong (CN); Xinlin Lu, Nantong (CN); Xiya Li, Song Shan Lake Dongguan (CN); Sidong He, Song Shan Lake Dongguan (CN); Sinming Chen, Nantong (CN); Jianbin Zhu, Nantong (CN); Xiaoli Zhao, Song Shan Lake Dongguan (CN); Suwen Wu, Song Shan Lake Dongguan (CN)

(73) Assignees: NANTONG CIMC-SPECIAL TRANSPORTATION EQUIPMENT MANUFACTURE CO., LTD, Nantong (CN); CIMC CONTAINERS HOLDING COMPANY LTD., Dongguan (CN); CHINA INTERNATIONAL MARINE CONTAINERS (GROUP) LTD., Guangdong (CN)

( * ) Notice: Subject to any disclaimer, the term of this patent is extended or adjusted under 35 U.S.C. 154(b) by 0 days.

(21) Appl. No.: 15/248,034

(22) Filed: Aug. 26, 2016

(65) Prior Publication Data
US 2018/0057251 A1   Mar. 1, 2018

(51) Int. Cl.
B65D 90/02   (2019.01)
B65D 88/12   (2006.01)

(52) U.S. Cl.
CPC ............ *B65D 90/02* (2013.01); *B65D 88/121* (2013.01); *B65D 90/022* (2013.01);
(Continued)

(58) Field of Classification Search
CPC .. B65D 88/121; B65D 90/022; B65D 90/027; B65D 90/0093; B65D 90/02;
(Continued)

(56) References Cited

U.S. PATENT DOCUMENTS 4,288,957 A     9/1981  Meehan
5,248,051 A  *  9/1993  Yurgevich ............ B65D 88/121
                                                    108/57.21
(Continued)

FOREIGN PATENT DOCUMENTS

CN       2509126 Y     9/2002
CN       2937012 Y     8/2007
(Continued)

OTHER PUBLICATIONS

Australian Full Examination Report No. 1 for corresponding application AU2015222589, dated Aug. 24, 2017.
(Continued)

*Primary Examiner* — Anthony D Stashick
*Assistant Examiner* — James M Van Buskirk
(74) *Attorney, Agent, or Firm* — Stephen T. Olson; Harness, Dickey & Pierce, P.L.C.

(57) ABSTRACT

The present invention provides a container having a bottom frame; the bottom frame includes a pair of bottom side rails, a plurality of cross member and a floor. The pair of bottom side rails are located at both sides of the bottom of the container respectively. The plurality of cross members are
(Continued)

located between and connected to the bottom side rails. The floor is laid on the cross members and extends along the longitudinal direction of the container; the floor comprises a first steel floor. The bottom frame further includes a grit discharging structure configured to discharge the grits, collected on the upper surface of the first steel floor after the inner surface and/or the welding seam on the inner surface of the container is shot-blasted, from the container. The container according to the present disclosure could allow for discharging the sand collected on the upper surface of the first steel floor after shot-blasting the inner surface and/or the welding seam on the inner surface of the container, thus facilitating the shot-blasting.

6 Claims, 5 Drawing Sheets

(52) U.S. Cl.
CPC .......... *B65D 90/027* (2013.01); *Y02P 20/145* (2015.11); *Y02W 30/43* (2015.05); *Y10T 29/49716* (2015.01)

(58) Field of Classification Search
CPC ................ B65D 19/00; B65D 19/0053; B65D 19/0067; B65D 9/00; B65D 25/2054; Y02P 20/145; Y02W 30/43; Y10T 29/49716; Y10T 29/479; C21D 7/06

USPC ........................................................ 220/601
See application file for complete search history.

(56) References Cited

U.S. PATENT DOCUMENTS

| | | | |
|---|---|---|---|
| 8,070,004 B2* | 12/2011 | Williams | B65D 90/023 |
| | | | 105/422 |
| 8,153,419 B2 | 4/2012 | McNelly | |
| 2003/0146212 A1* | 8/2003 | Mai | B65D 88/121 |
| | | | 220/1.5 |
| 2005/0029256 A1 | 2/2005 | Chen et al. | |
| 2014/0251989 A1* | 9/2014 | Clive-Smith | B65D 90/048 |
| | | | 220/1.6 |

FOREIGN PATENT DOCUMENTS

| | | |
|---|---|---|
| CN | 101497394 A | 8/2009 |
| CN | 202743792 U | 2/2013 |
| CN | 203332738 U | 12/2013 |
| DE | 6906449 U | 10/1969 |

OTHER PUBLICATIONS

Australian Full Examination Report No. 2 for corresponding application AU2015222589, dated Nov. 23, 2017.
German Office Action for parallel application DE 11 2015 001 006.8 , Munich, dated Mar. 12, 2018, with machine translation thereof.

* cited by examiner

CONTAINER

CROSS-REFERENCE TO RELATED APPLICATIONS

The present application is a continuation application claiming priority to International Application No. PCT/CN2015/073133 filed on 15 Feb. 2015, which claims priority to Chinese Patent Application No. 201410073410.9 filed with the State Intellectual Property Office of China on 28 Feb. 2014, which is herein incorporated by reference in its entirety.

FIELD OF THE INVENTION

The present invention relates to a container.

BACKGROUND

With the globalization of world trade, the container plays an important role in the international carriage. A conventional container generally comprises a pair of side walls, a door end, a front end, an upper plate, a top plate and a bottom frame. The bottom frame is a key support structure of the container. The bottom frame generally comprises a bottom side rail, a cross member and a floor above the cross member.

To save timber, one tends to use the steel floor instead of the wood floor. However, in the process of manufacturing a container using the steel floor, it is usually required to shot-blasting the inner surface (including the upper surface of the steel floor) and the welding seam thereon of the container. The grits collected on the upper surface of the first steel floor after the inner surface and/or the welding seam on the inner surface of the container is shot-blasted tend to accumulate on the upper surface of the steel floor. Since the steel floor is connected together with the bottom side rail and the cross member, the grits collected on the upper surface of the steel floor after shot-blasting the inner surface and/or the welding seam on the inner surface of the container are not easy to be discharged from the container.

Therefore, there is a need to propose a container capable of solving the problems existed in prior art.

SUMMARY

In this SUMMARY section, a series of simplified concepts are introduced which will get a further detailed description in the DETAILED DESCRIPTION section. The SUMMARY section of the present invention does not intend to define the critical features and the essential technical features of the claimed technical solution, nor intend to determine the protection reach of the claimed technical solution.

The present invention provides a container for the purpose of solving the above problem. The container comprises a bottom frame comprising: a pair of bottom side rails located at both sides of the bottom of the container respectively; a plurality of cross members located between and connected to the bottom side rails; and a floor laid on the cross members and extending along the longitudinal direction of the container, the floor comprising a first steel floor; wherein the bottom frame further comprises a grit discharging structure configured to discharge the grits, collected on the upper surface of the first steel floor after the inner surface and/or the welding seam on the inner surface of the container is shot-blasted, from the container.

Preferably, the grit discharging structure comprises a grit discharging slit and a wood floor, the grit discharging slit is provided at least partially between adjacent two of the plurality of cross members, the wood floor is connected to the first steel floor and covers the grit discharging slit.

Preferably, the grit discharging structure comprises a grit discharging slit and a second steel floor, the grit discharging slit is provided at least partially between adjacent two of the plurality of cross members, the second steel floor is connected to the first steel floor and covers the grit discharging slit.

Preferably, the grit discharging slit is provided at least partially between the cross member of the plurality of cross members located at least one of the two ends of the container and the cross member adjacent thereto.

Preferably, the grit discharging slit is provided at least partially between the cross member of the plurality of cross members located at the front end of the container and the cross member adjacent thereto.

Preferably, the grit discharging slit extends in a transverse direction of the container from one bottom side rail of the container to another bottom side rail of the container.

Preferably, the grit discharging slit extends along the transverse direction of the container, and at least one of the two sides of the grit discharging slit is provided in the first steel floor.

Preferably, one end of the bottom frame comprises a gooseneck groove which comprises a upper horizontal part, vertical parts extending downward from both sides of the upper horizontal part, and lower horizontal parts extending bilaterally from the bottom of the vertical parts, both sides of the upper horizontal part connects with the first steel floor, wherein the grit discharging structure comprises a grit discharging slit located in the first steel floor at least one side of the upper horizontal part, and a wood floor or second steel floor for covering the grit discharging slit and connected to the first steel floor.

Preferably, the grit discharging slit is provided at least partially between the cross member of the plurality of cross members located at one end of the bottom frame and the cross member adjacent thereto.

Preferably, the first steel floor comprises a plurality of corrugated sections extending along the longitudinal direction of the container.

Preferably, the steel floor further comprises a horizontal section extending along the longitudinal direction of the container, the horizontal section being connected between the bottom side rail and the plurality of corrugated sections at both sides of the plurality of corrugated sections.

Preferably, the dimension of the horizontal section in the transverse direction of the container is less than or equal to 300 mm.

Preferably, the grit discharging structure comprises a grit discharging hole provided at the bottom side rail.

Preferably, the grit discharging structure comprises a grit discharging hole provided at the cross member of the plurality of cross members located at the front end of the container.

The floor of the container according to the present invention comprises a grit discharging structure for discharging grits communicating with the upper surface of the first steel floor, therefore, such a container enables discharging the grits, collected on the upper surface of the first steel floor after shot-blasting the inner surface and/or the welding seam on the inner surface of the container, from the grit discharging structure, thus facilitating the shot-blasting.

BRIEF DESCRIPTION OF THE DRAWINGS

The drawings of the embodiments of present invention listed below are used as a part of the present invention herein for the understanding of the present invention. The drawings illustrate the embodiments of the present invention and its description, so as to explain the principle of the present invention. In which.

DETAILED DESCRIPTION

The description below gives a large quantity of specific details so as to provide a thorough understanding of the present invention. However, as obvious to the skilled in this art, the embodiment of present invention may be implemented without one or more of these details. Some of the technical features well-known in this art are not described in other examples so as not to confuse with the embodiment of present invention.

A detailed structure would be proposed in the following description for the purpose of thorough understanding the embodiment of present invention. Apparently, the implementation of the embodiment of present invention is not limited to special details known by the skilled in this art. The preferred embodiments of the present invention are described in detail as follows, however, the present invention can also comprise other embodiments besides these detailed description.

The present invention provides a container. This container generally comprises a pair of side walls, a door end, a front end opposite to the door end, an upper plate, a top plate and a bottom frame. For the simplicity of the illustration, the present invention merely illustrates the bottom frame of the container. A detailed description about the bottom frame of the present invention will be made below in conjunction with FIGS. 1-6.

Figure 1:
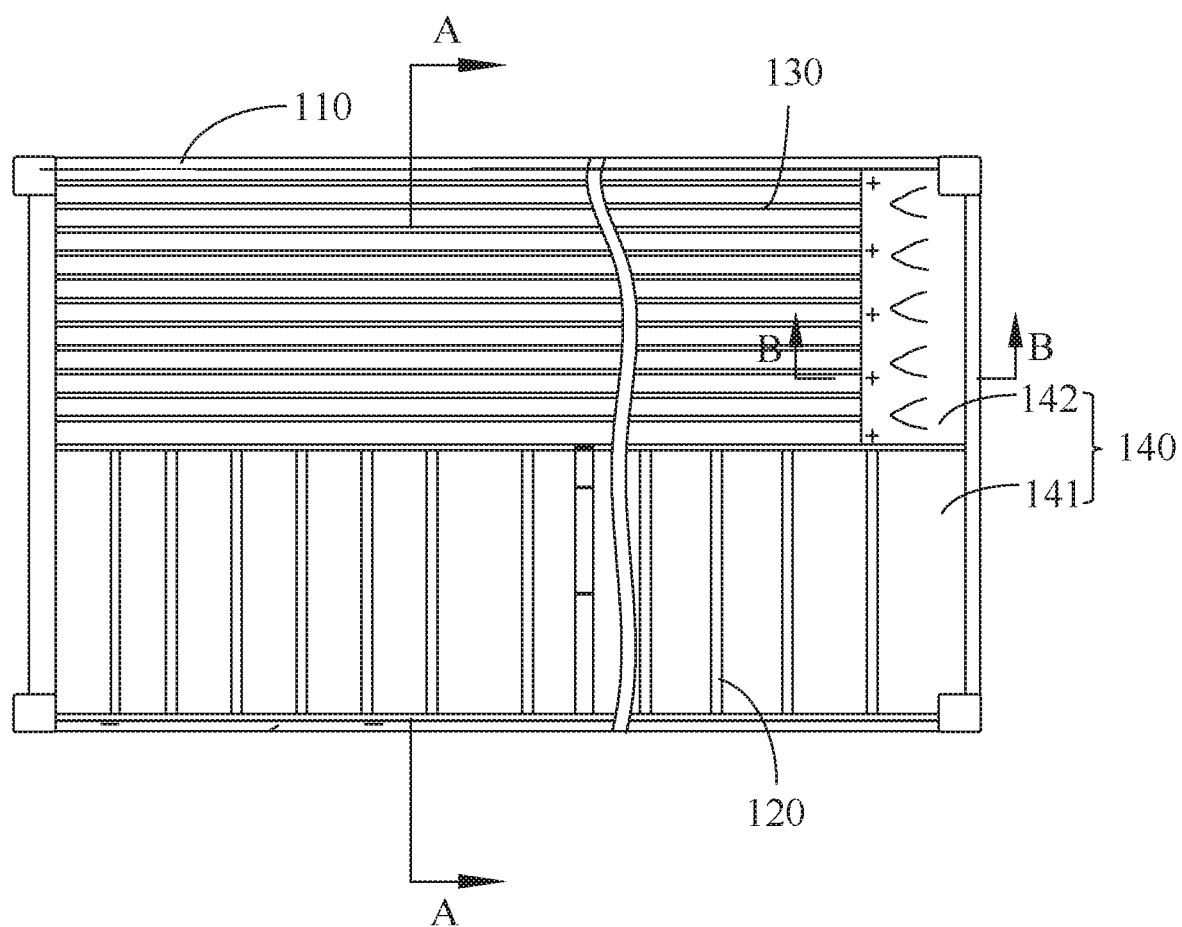
FIG. 1 is a schematic view showing the bottom frame of the container according to one embodiment of the present invention.

As shown in FIG. 1, the bottom frame 100 comprises a pair of bottom side rails 110, a plurality of cross members 120 and a floor (not shown). Wherein the pair of bottom side rails 110 locate at both sides of the bottom of the container respectively, and extend along the longitudinal direction of the container. To be specified, the "longitudinal direction" here means the length direction of the container; accordingly, the "transverse direction" to be mentioned hereinafter means a direction perpendicular to the above "longitudinal direction" in the horizontal plane. Furthermore, the "side" mentioned herein and the "side part" mentioned hereinafter are described with respect to the longitudinal direction of the container. That is to say, the "side" and "side part" extend along the longitudinal direction of the container. Accordingly, the "end" to be mentioned hereinafter is described with respect to the transverse direction of the container. That is to say, the "end" and "end part" extend along the transverse direction of the container. The plurality of cross members 120 are located between and connected to the bottom side rails 110. Usually, the cross members 120 are provided between the bottom side rails 110 and perpendicular to the bottom side rails 110. The shape of the cross section of the cross member 120 may be one or more of the C-shape, L-shape and I-shape. Naturally, the present invention does not intend to limit the shape of the cross section of the cross member 120, the cross member 120 may be any suitable one of the existing cross members according to actual conditions.

The floor is laid above the cross member 120 and extends along the longitudinal direction of the container. To reduce the use of timber, one tends to use the steel floor instead of the wood floor. As shown in FIG. 1, the floor comprises a first steel floor 130. However, when a steel floor is used, it is generally required to sand the inner surface (including the upper surface of the first steel floor 130) and the welding seam at the joint on the inner surface of the container after connecting the first steel floor 130 with the bottom side rails 110 and the cross members 120, so as to remove the rust or other contaminants. Wherein, the grits collected on the upper surface of the first steel floor after the inner surface and/or the welding seam on the inner surface of the container is shot-blasted tend to accumulate on the upper surface of the first steel floor 130. Therefore, based on the conception of the present invention, the bottom frame 100 further comprises a grit discharging structure 140 configured to allow for discharging the grits, collected on the upper surface of the first steel floor 130 after shot-blasting the inner surface and/or the welding seam on the inner surface of the container, from the container, so that the sand, collected on the upper surface of the first steel floor 130 in the process of shot-blasting, can be discharged from the container.

Figure 3:
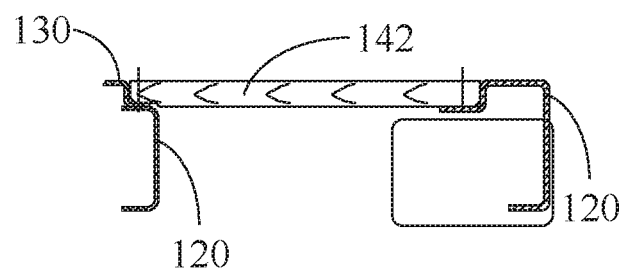
FIG. 3 is a sectional view taken along the line B-B of the bottom frame of the container shown in FIG. 1.

Specifically, in one preferable embodiment according to the present invention, the grit discharging structure 140 comprises a grit discharging slit 141 and a wood floor 142. Wherein the grit discharging slit 141 is provided between adjacent two of the plurality of cross members 120, and the wood floor 142 is connected to the first steel floor 130 at one end of the first steel floor 130, and covers the grit discharging slit 141. In the process of manufacture the container, the grit discharging slit 141 may be first reserved at a position where the wood floor 142 is to be arranged, so as to permit discharging the grits, collected on the upper surface of the first steel floor 130 after shot-blasting the inner surface and/or the welding seam on the inner surface of the container, from the container. After the completion of the shot-blasting, the wood floor 142 is connected between adjacent two cross members 120 and to the first steel floor 130 through screw or similar connection manners, as shown in FIG. 3.

To be specified, although in this embodiment, the grit discharging slit 141 is shown to be just located between adjacent two of the plurality of cross members 120, the wood floor 142 is connected between adjacent two cross members 120. However, the grit discharging slit may also span adjacent two cross members in the longitudinal direction, and the wood floor may be connected to the first steel floor. Otherwise, both the grit discharging slit and the wood floor may also each be located between adjacent two cross members. For example, both ends of the grit discharging slit do not extend to the cross members in the longitudinal direction, and accordingly, both end of the wood floor for covering the grit discharging slit do not contact with the cross members in the longitudinal direction. Alternatively, for example, only one end of the grit discharging slit in the longitudinal direction extends to the cross member, while the other end does not extend to the cross member. Accordingly, the wood floor for covering the grit discharging slit contacts with the cross member only at one end thereof, the other end does not contact with the cross member. That is to say, the grit discharging slit and the wood floor are at least partially provided between adjacent two of the plurality of cross members.

The grit discharging slit 141 and the wood floor 142 may be provided in various positions and arrangements. For example, in one embodiment according to the present invention, the grit discharging slit 141 can be at least partially provided between the cross member 120 of the plurality of cross members 120, at two ends (the front end and the door end) or one of the two ends of the container, and a cross member adjacent to this cross member 120. That is to say, the grit discharging slit 141 can be provided at the end(s) of the bottom frame 100. Correspondingly, the wood floor 142 for covering the grit discharging slit 141 can be provided at the end(s) of the bottom frame 100. In this way, no disconnection is required intermediate of the first steel floor 130, thus improving the strength.

Of course, in practice, for the purpose of saving process steps to improve production efficiency, it is possible to provide the grit discharging slit 141 merely between the cross member 120 of the plurality of cross members 120, at one of the two ends, and a cross member adjacent this cross member 120. Correspondingly, the wood floor 142 can be provided merely between the cross member 120 of the plurality of cross members, at one of the two ends, and the cross member adjacent to this cross member 120, to cover this grit discharging slit 141. Due to the fact that the door end of the container always requires a greater carrying capacity while the front end opposite to the door end requires a less carrying capacity, the grit discharging slit 141 can be provided merely between adjacent two of the plurality of cross members 120 at the front end of the container, and accordingly, the wood floor 142 can be provided merely between adjacent two of the plurality of cross members 120 at the front end of the container. Such an arrangement can not only enable discharging the grits, collected on the upper surface of the first steel floor 130 after shot-blasting the inner surface and/or the welding seam on the inner surface of the container, from the container, but also is unlikely to influence the carrying capacity and bending strength of the door end of the container. Besides, the grit discharging structure also functions as a ventilation structure during the painting process.

The dimensions of the grit discharging slit 141 and the wood floor 142 along the transverse direction can be determined according to actual conditions. For example, in one embodiment according to the present invention, the grit discharging slit 141 can extend from one bottom side rail 110 of the container to another bottom side rail 110 of the container in the transverse direction of the container, and accordingly, the wood floor 142 can extend from one bottom side rail 110 of the container to another bottom side rail 110 of the container in the transverse direction of the container. That is to say, the grit discharging slit 141 and the wood floor 142 run through the entire floor of the container in the transverse direction. Here the first steel floor 130 can has a regular shape so as to be easy to manufacture.

Figure 4:
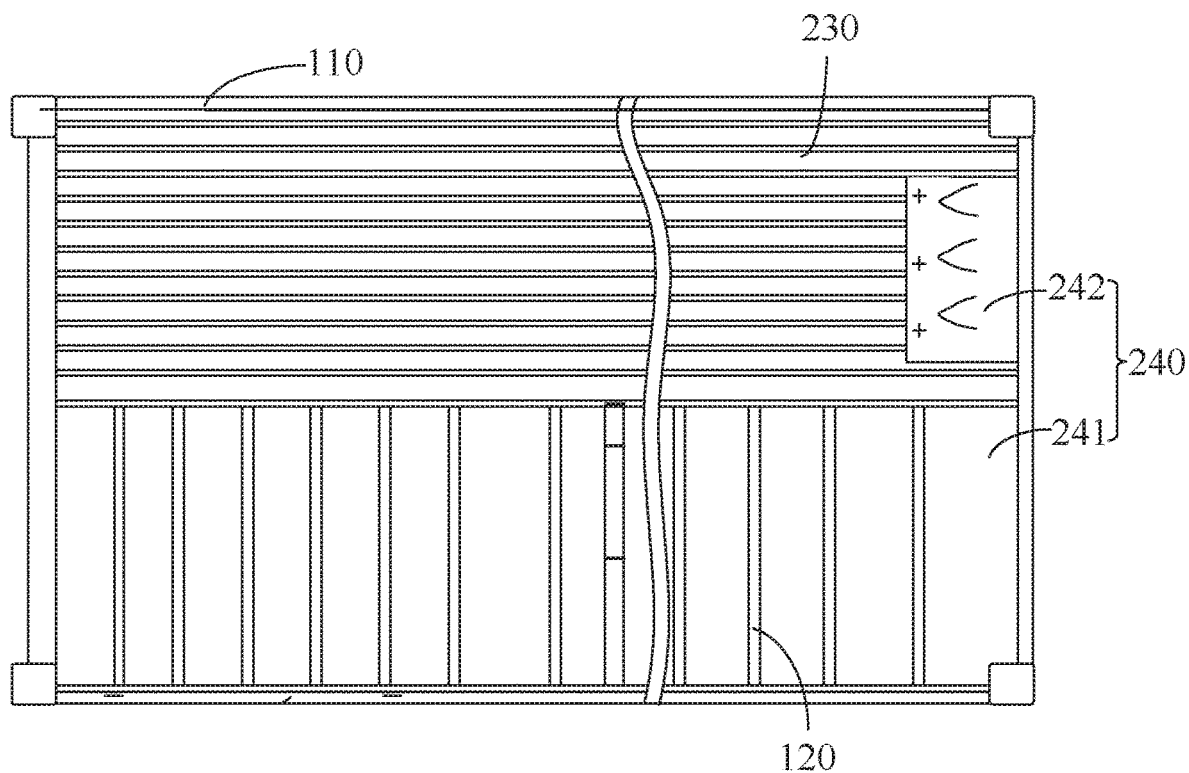
FIG. 4 is a schematic view showing the bottom frame of the container according to another embodiment of the present invention.

Of course, in practice, the wood floor may not run across the entire floor of the container in the transverse direction, so as to save timber. For example, in another embodiment according to the present invention, as shown in FIG. 4, the floor of the bottom frame 200 similarly comprises a first steel floor 230. The grit discharging structure 240 comprises a grit discharging slit 241 and a wood floor 242. The grit discharging slit 241 and the wood floor 242 are at least partially located between adjacent two of the plurality of cross members 120, and extend in the transverse direction of the container. The difference is that the grit discharging slit 241 does not extend to the two bottom side rails 110 in the transverse direction. That is to say, two side parts of the grit discharging slit 241 are each provided in the first steel floor 230. Accordingly, the wood floor 242 for covering the grit discharging slit 241 does not contact with the two bottom side rails 110 in the transverse direction. That is to say, the grit discharging slit 241 and the wood floor 242 are all located intermediate of the bottom frame 200 in the transverse direction of the container. Such an arrangement for both the grit discharging slit 241 and the wood floor 242 can not only enable discharging the grits, collected on the upper surface of the first steel floor 230 after shot-blasting the inner surface and/or the welding seam on the inner surface of the container, from the container, but can also save the amount of the timber used.

Furthermore, in other embodiments (not shown) according to the present invention, the grit discharging slit extends in the transverse direction of the container, and merely extends to one of the bottom side rails in the transverse direction, that is to say, one side part of the grit discharging slit is provided in the first steel floor, while another side part is provided at the bottom side rail. Accordingly, the wood floor for covering the wood floor can extend in the transverse direction of the container, and merely contacts with one of the bottom side rails in the transverse direction, but does not contact with the other bottom side rail.

Furthermore, although the grit discharging structure in this embodiment is shown to comprise a wood floor, but in other embodiments (not shown) according to the present invention, it is also possible to use a second steel floor instead of the wood floor for covering the grit discharging slit. Specifically, in other embodiments (not shown) of the present invention, the grit discharging structure may comprises a grit discharging slit and a second steel floor, wherein the grit discharging slit is provided at least partially between adjacent two cross members, and the second steel floor is connected to the first steel floor and covers the grit discharging slit. In the process of manufacturing the container, a grit discharging slit may be first reserved at a position where the second steel floor should be provided, to allow for discharging the grits, collected on the upper surface of the first steel floor after the inner surface and/or the welding seam on the inner surface of the container is shot-blasted, from the container. After the completion of the shot-blasting, the second steel floor is connected between two adjacent cross members through a screw or similar connecting means, so as to cover the shot-blasting slit. With such an arrangement, it is also possible to allow for discharging the sand, collected on the upper surface of the first steel floor after the inner surface and/or the welding seam on the inner surface of the container is shot-blasted, from the container, thus facilitating the shot-blasting.

Additionally, in other embodiments (not shown) of the present invention, the grit discharging structure may further comprise a grit discharging hole, and the quantity of the grit discharging holes may be more than one so as to improve the grit discharging efficiency. The plurality of grit discharging holes may be evenly arranged at the bottom side rail or at the cross member of the plurality of cross members located at the front end of the container. The grits, collected on the upper surface of the first steel floor after shot-blasting the inner surface and/or the welding seam on the inner surface of the container, may be discharged from the container through the grit discharging holes. In a large-sized (for example, 40 inches) container, due to the large dimension of the container in the longitudinal direction, such a arrangement is more beneficial for discharging the grits collected on the upper surface of the first steel floor, in comparison with the arrangement in which only one end of the first steel floor comprises a grit discharging structure.

Figure 5:
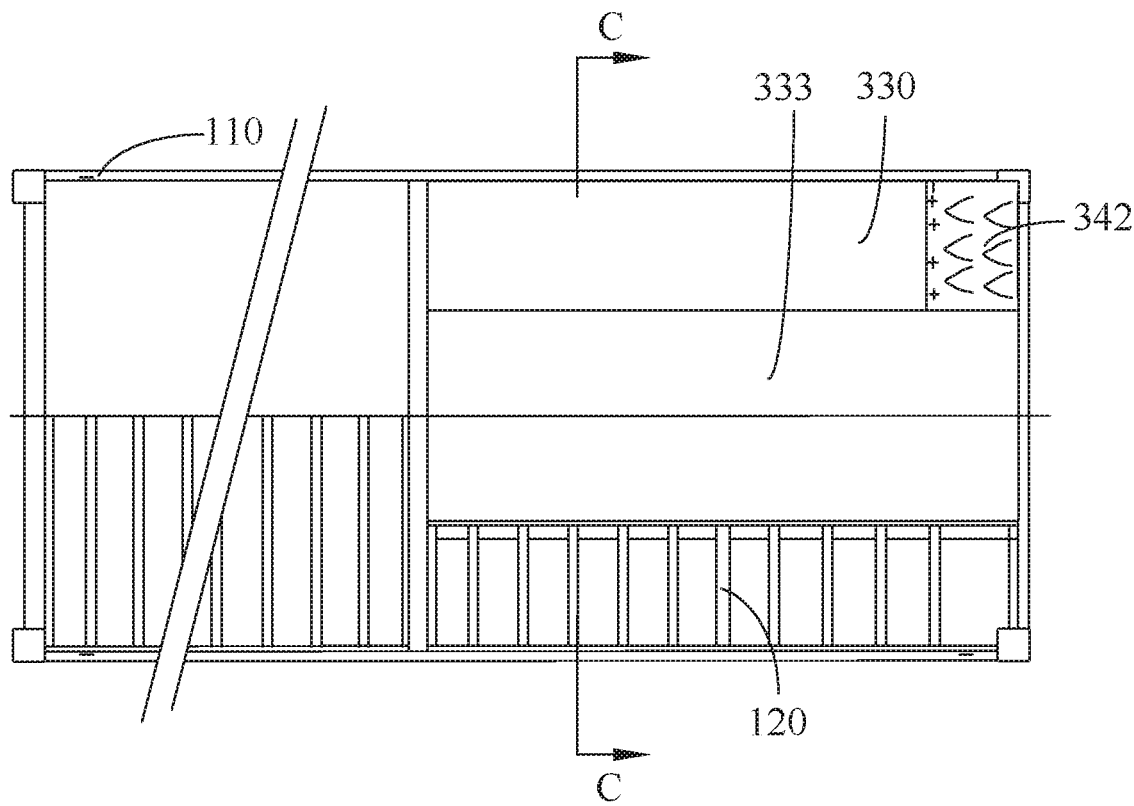
FIG. 5 is a schematic view showing the bottom frame of the container according to still another embodiment of the present invention.
Figure 6:
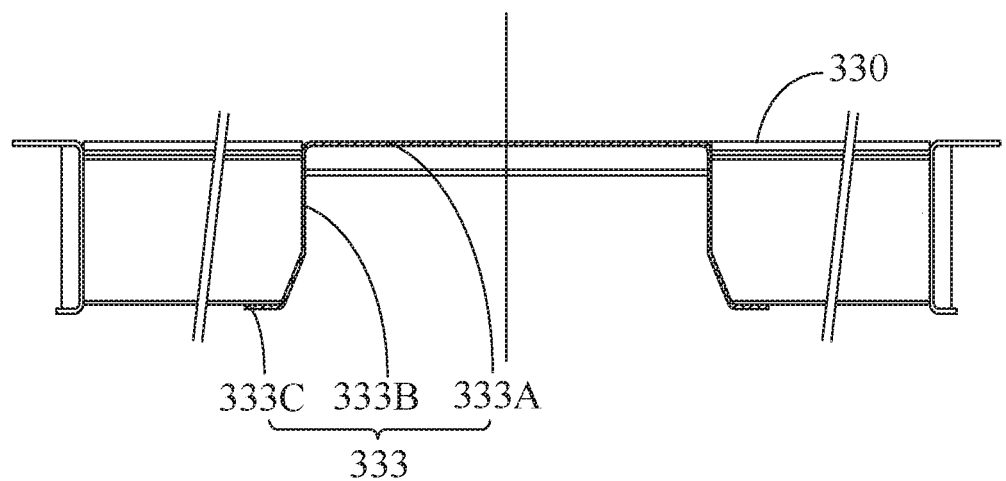
FIG. 6 is a sectional view taken along the line C-C of the bottom frame of the container shown in FIG. 5.

In the container field, to cooperate with the structure of a trailer with gooseneck on the chassis, one end of the bottom frame 300 of the container may be usually provided with a corresponding gooseneck groove 333, as shown in FIGS. 5 and 6. The gooseneck groove 333 may be provided at the front end and/or the door end of the container. For example, in one preferable embodiment according to the present invention, the gooseneck groove 333 can be provided at the front end of the container. FIG. 6 illustrates a sectional view taken along the line C-C of the bottom frame 300, it can be seen clearly from FIG. 6 the structure of the gooseneck groove 333.

As shown in FIG. 6, the gooseneck groove 333 may comprise an upper horizontal part 333A, vertical parts 333B extending downward from both sides of the upper horizontal part 333A, and lower horizontal parts 333C extending bilaterally from the bottom of the vertical part 333B. Generally, the gooseneck groove 333 can be made from steel. Both sides of the gooseneck groove 333 may be provided with the steel floor or the wood floor. For example, in one embodiment according to the present invention, to save timber, both sides of the upper horizontal part 333A of the gooseneck groove 333 are connected to the first steel floor 330. In such a case, to facilitate discharging the grits, collected on the upper surface of the first steel floor 330 after shot-blasting the inner surface and/or the welding seam on the inner surface of the container, from the container, the first steel floor 330 may be provided with a grit discharging slit (not shown) and a wood floor 342 for covering the grit discharging slit and connected to the first steel floor 330. Therefore, in this embodiment, the grit discharging slit and the wood floor 342 for covering the grit discharging slit constitute the grit discharging structure.

The grit discharging slit and the wood floor 342 may be provided in various positions and dimensions. For example, in one embodiment according to the present invention, to save timber, as shown in FIG. 5, the grit discharging slit and the wood floor 342 can be provided in the first steel floor 330 at a side of the upper horizontal part 333A of the gooseneck groove 333. The grit discharging slit and the wood floor 342 extend in the transverse direction of the container. The grit discharging slit and the wood floor 342 can be arranged at least partially between the cross member 120 of the plurality of cross members 120, located at one end of the bottom frame 300, and a cross member adjacent to this cross member 120. For example, in one embodiment according to the present invention, the gooseneck groove 333 is provided at one end of the bottom frame 300 at the front end, and accordingly, the grit discharging slit and the wood floor 342 can be provided at least partially between the cross member 120 of the plurality of cross members, located at the front end of the bottom frame 300, and a cross member adjacent to this cross member 120.

Of course, the grit discharging slit and the wood floor may be not provided between two adjacent cross beams located at the end. For example, in other embodiments (not shown) according to the present invention, the grit discharging slit and the wood floor can also be provided in the steel floor at a side of the upper horizontal part of the gooseneck groove, and at least partially provided between adjacent two cross members intermediate of the plurality of cross members. Furthermore, in other embodiments (not shown) according to the present invention, the steel floor at both sides of the upper horizontal part of the gooseneck groove may also be each provided with a grit discharging slit and a wood floor. Additionally, it is also possible to provide the grit discharging slit and the wood floor at one end of the steel floor without the gooseneck groove. Furthermore, in other embodiments (not shown) of the present invention, it is also possible to used a second steel floor (not shown) instead of the wood floor 342 for covering the grit discharging slit. In such a case, the grit discharging slit and the second steel floor for covering the grit discharging slit constitute a grit discharging structure.

Figure 2:
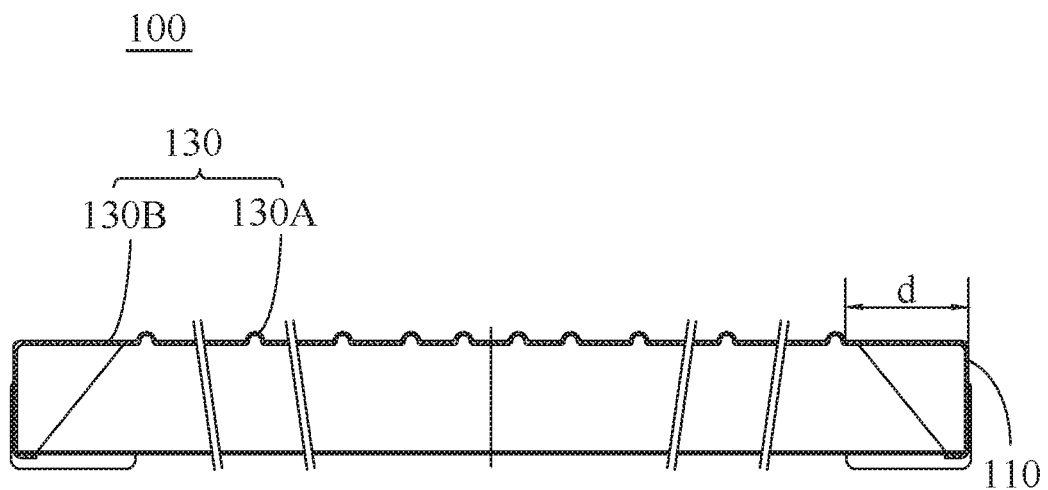
FIG. 2 is a sectional view taken along the line A-A of the bottom frame of the container shown in FIG. 1.

The first steel floor may be a flat plate, and it may also be a corrugated plate. For example, in one embodiment according to the present invention, as shown in FIGS. 1 and 2, the first steel floor 130 comprises a plurality of corrugated sections 130A parallel with each other extending in the longitudinal direction of the container. The first steel floor 130 having the corrugated section 130A comprises a favorable carrying capacity and greater bending strength. There may be various shapes for the shape of the cross section of the corrugated section 130A. For example, in one embodiment according to the present invention, as shown in FIG. 2; the cross section of the corrugated section 130A of the first steel floor 130 may be V-shaped. For the purpose of avoiding dust accumulation, the V-shape may open downwardly. To be specified, such a V-shaped corrugated section 130A may not be an exact V-shape sharply-angled at its top end, but its top end may comprise a curvature, thus assuming an approximate V-shape. Of course, in other embodiments (not shown) according to the present invention, the cross section of the corrugated section of the first steel floor may also be Similarly, the opening of the Ω-shape, the semi-circle, or the U-shape may also face downward so as to avoid dust accumulation.

Furthermore, the first steel floor 130 can also comprises a horizontal section 130B besides the corrugated section 130A. Specifically, as shown in FIG. 2, the first steel floor 130 further comprises a horizontal section 130B extending in the longitudinal direction of the container. The horizontal section 130B is connected between the bottom side rail 110 and a plurality of corrugated sections 130A at both sides of a plurality of corrugated sections 130A. That is to say, the horizontal section 130B is connected between the corrugated section 130A at the outermost side of the plurality of corrugated sections 130A and the bottom side rail 110. Due to the fact that the edge zone of the first steel floor 130 has a lower requirement for the carrying capacity and bending strength with respect to other zones, the edge zone of the first steel floor 130 may not be necessary to provided with corrugated sections, thus reducing the fabrication cost. Furthermore, the horizontal section 130B facilitates the connection of the first steel floor 130 to the bottom side rail 110.

The dimension d of the horizontal section 130B in the transverse direction of the container can be determined according to actual conditions. For example, in one embodiment according to the present invention, the dimension d of the horizontal section 130B in the transverse direction of the container may be less than or equal to 300 Mumford example, it may be 200 mm.

In summary, the floor of the container according to the present invention comprises a grit discharging structure communicating with the upper surface of the first steel floor, therefore enabling discharging the grits, collected on the upper surface of the first steel floor 130 after shot-blasting the inner surface and/or the welding seam on the inner surface of the container, from the container, which facilitates the shot-blasting.

The present invention has been described with the above embodiments thereof, however, it should be appreciated that the above embodiments are used only for the purpose of illustration and explanation, rather than limiting the present invention within the scope of the described embodiments. Furthermore, the skilled in this art would understand that the present invention is not restricted to the above embodiments, the teaching according to the present invention can also be altered and modified in various ways, all of which fall into the protective scope claimed by the present invention.

What is claimed is:

1. A container having a bottom frame, the bottom frame comprising:
    a pair of bottom side rails located at both sides of the bottom of the container respectively;
    a plurality of cross members located between and connected to the bottom side rails; and
    a floor laid on the cross members and extending along a longitudinal direction of the container, the floor comprising a first steel floor including a plurality of corrugations oriented parallel to one another and parallel to the longitudinal direction;
    wherein the bottom frame further comprises a grit discharging structure configured to discharge grits, collected on an upper surface of the first steel floor after at least one of an inner surface and a welding seam on the inner surface of the container is shot-blasted, from the container, and also to function as ventilation during a painting process,
    wherein the grit discharging structure includes a grit discharging slit provided at least partially between two adjacent cross members of the plurality of cross members located at one end of the bottom frame and the cross member adjacent thereto, the grit discharging slit disposed beyond a longitudinal end of the first steel floor, and
    wherein the grit discharging structure is elongated in a transverse direction of the container.

2. The container according to claim 1, wherein the grit discharging slit is located in the first steel floor, at least one side of an upper horizontal part, and a wood floor or second steel floor for covering the grit discharging slit and connected to the first steel floor.

3. The container according to claim 1, wherein one end of the bottom frame includes an upper horizontal part, vertical parts extending downward from both sides of the upper horizontal part, and lower horizontal parts extending bilaterally from the bottom of the vertical parts, both sides of the upper horizontal part connects with the first steel floor, wherein the grit discharging structure includes a grit discharging slit located in the first steel floor, at least one side of the upper horizontal part, and a wood floor or second steel floor for covering the grit discharging slit and connected to the first steel floor.

4. The container according to claim 3, wherein the grit discharging slit is provided at least partially between the cross member of the plurality of cross members located at one end of the bottom frame and the cross member adjacent thereto.

5. The container according to claim 3, wherein the grit discharging slit is provided at least partially between the cross member of the plurality of cross members located at one end of the bottom frame and the cross member adjacent thereto.

6. A container having a bottom frame, the bottom frame comprising:
    a pair of bottom side rails located at both sides of the bottom of the container respectively;
    a plurality of cross members located between and connected to the bottom side rails; and
    a floor laid on the cross members and extending along a longitudinal direction of the container, the floor comprising a first steel floor including a plurality of corrugations oriented parallel to one another and parallel to the longitudinal direction;
    wherein the bottom frame further comprises a grit discharging structure configured to discharge grits collected on an upper surface of the first steel floor after at least one of an inner surface and a welding seam on the inner surface of the container is shot-blasted, from the container, and also to function as ventilation during a painting process,
    wherein the grit discharging structure is elongated in a transverse direction of the container, and
    the grit discharging structure includes a grit discharging slit provided at least partially between two adjacent cross members of the plurality of cross members, the grit discharging slit disposed beyond a longitudinal end of the first steel floor.

* * * * *